AUTOMATIC FREQUENCY CONTROL FOR LOW INPUT IMPEDANCE OSCILLATORS
Filed April 29, 1960
2 Sheets-Sheet 1
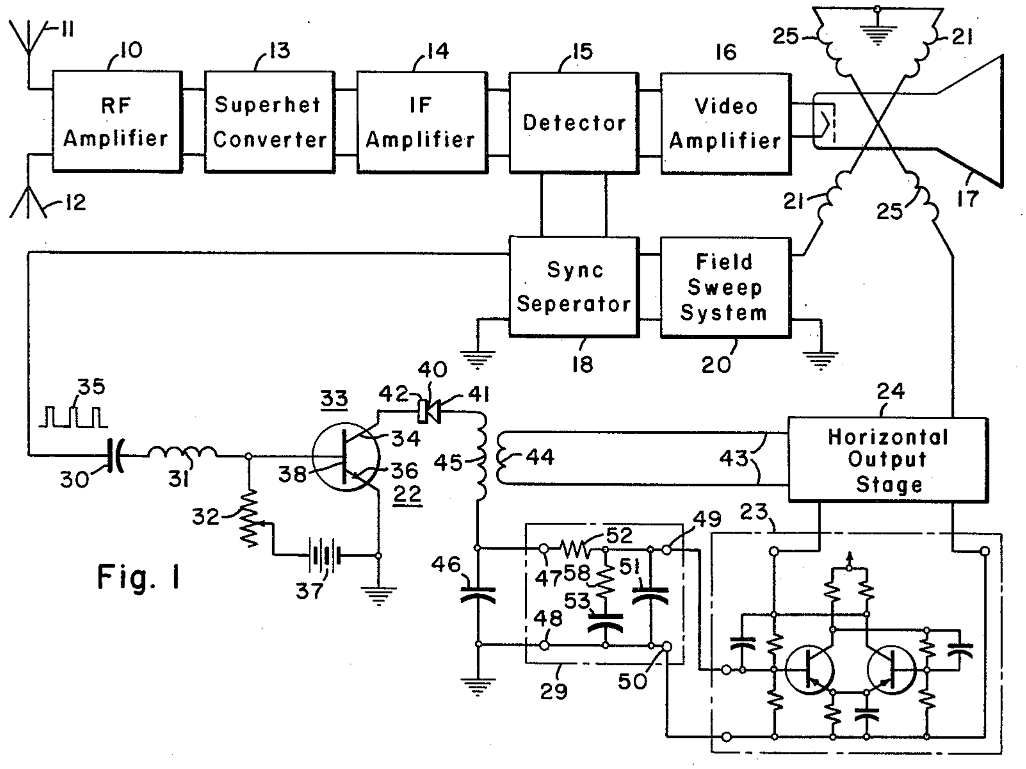
Fig. I
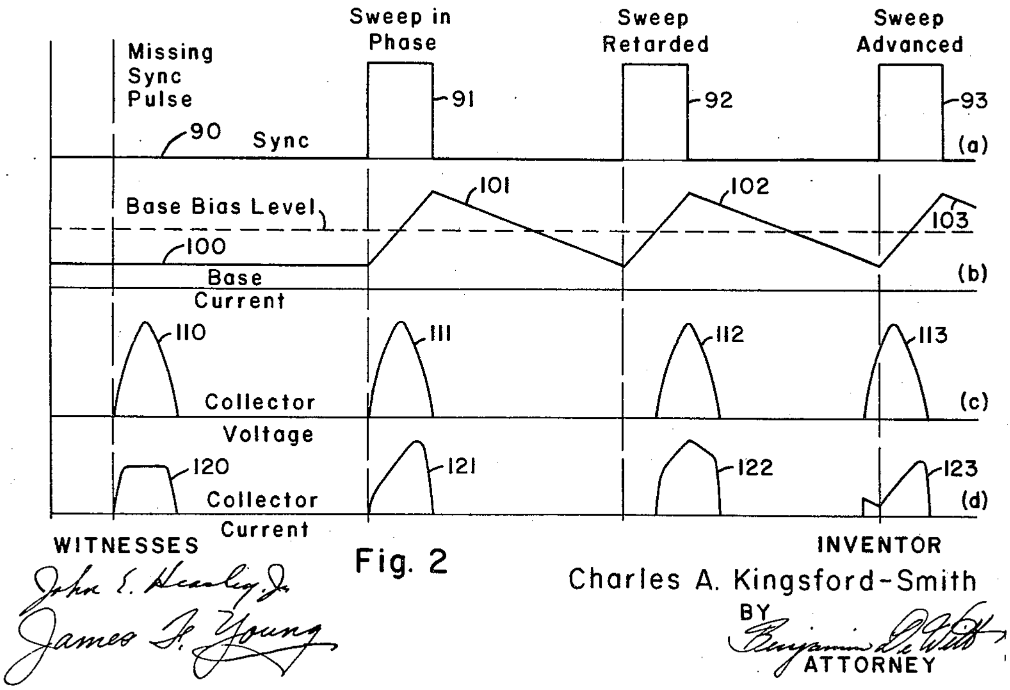
Fig. 2
WITNESSES
INVENTOR
Charles A. Kingsford-Smith
BY
ATTORNEY

3,038,033
AUTOMATIC FREQUENCY CONTROL FOR LOW INPUT IMPEDANCE OSCILLATORS

Charles A. Kingsford-Smith, Menlo Park, Calif., assignor to Westinghouse Electric Corporation, East Pittsburgh, Pa., a corporation of Pennsylvania
Filed Apr. 29, 1960, Ser. No. 25,634
6 Claims. (Cl. 178—69.5)

The present invention relates to automatic frequency control circuits for periodic wave generators and more particularly to an improved control circuit for use in transistorized television receivers for synchronizing the deflection of the cathode ray tube with the synchronizing components of the incoming television signals.

In conventional television receivers the beam of a cathode ray tube is scanned both vertically and horizontally to traverse the image display screen in a manner which must be time correlated with the sequentially received picture information. To assure that a particular discrete portion of the video information is directed to the correct portion of the display screen, both the horizontal and vertical scanning of the picture screen must be synchronized with synchronizing components of the received television signal. Direct control methods utilizing received synchronization pulses to directly trigger a scanning wave generator are undesirable because noise pulses which cannot be conveniently distinguished from the synchronization pulses, may spuriously trigger the scanning wave generator resulting in spurious phasing of the scanning wave and consequential distortion of the television picture. To overcome the foregoing difficulty, most present day television receivers utilize a free-running oscillator to generate the scanning wave. An automatic frequency control circuit is provided for governing the frequency and phase of the free-running scanning wave oscillator. Such control circuits normally comprise a phase detector which is responsive jointly to the line synchronizing components of the received television signal and to the sawtooth output wave of the scanning wave generator to provide a control voltage dependent upon the phase relationship between those two signals. The output control voltage of the phase detector is utilized to control the frequency of the scanning wave oscillator or multivibrator to thereby synchronize the oscillator with the line synchronizing components of the received television signal. Such automatic frequency control circuits are preferred in present day television receivers because they are relatively immune to noise disturbances and/or temporary loss of the received synchronizing components. Such circuits enable reasonably good synchronization of the scanning wave generator even in the presence of substantial noise interference in the received signal.

One commonly used phase detector circuit of the above-described type comprises a pair of diodes connected in balanced relation in a bridge configuration. The input signals to such dual-diode phase detector circuits are (1) synchronizing pulses from the sync separator of the television receiver, and (2) a sawtooth waveform derived from the output circuit of the scanning wave generator or from integration of the scanning wave retrace pulses. In conventional television receivers the output voltage of the dual-diode phase detector is filtered to remove alternating current components and noise pulses and is used to vary the bias on a control grid of a discharge device comprising a portion of the scanning wave generator multivibrator circuit. The conventional dual-diode phase detectors as described above are passive circuits which provide no voltage or current gain but merely compare the relative phases of the two signals applied thereto. Such phase detectors are adequate when used to control the bias voltage applied to a conventional tube-type multivibrator because control of such multivibrators requires only a bias potential applied to a high impedance input circuit such as the grid circuit of a conventional vacuum tube.

The present invention is directed to automatic frequency control of scanning wave generators which utilize transistor multivibrators or other transistorized scanning wave generators having low impedance input circuits. The provision of transistor circuits in television receivers in place of the conventional vacuum tube circuits is highly desirable in that the transistor circuits are inherently more compact, more efficient, more rugged and longer lived. One of the concepts on which the present invention is based is the perception that when a transistor multivibrator or other transistor oscillator is used as the scanning wave generator in a television receiver, conventional dual-diode phase detector circuits are inadequate to provide the control signal power needed for controlling the frequency of such transistor scanning wave generators. In order to use conventional dual-diode phase detector circuits, one or more amplification stages would be required as D.C. amplifiers connected in cascade between the phase detector output and the low impedance input circuit of the multivibrator scanning wave generator. The provision of such additional amplification stages in commercial television receivers is practically prohibited by the thermal instability of transistor circuits and by economy considerations. The present invention overcomes the foregoing difficulty by providing a frequency control circuit having substantial gain, utilizing a single transistor, and having a low impedance output circuit capable of directly controlling the frequency of a low impedance multivibrator or other low input impedance scanning wave generator circuit.

Accordingly, it is a primary object of the present invention to provide an automatic frequency control circuit for comparing the phase difference of two pulsating signals and for producing a direct current signal corresponding to the phase relationship of said two signals and of sufficient power to provide frequency control of a low input impedance oscillator.

It is another object of the present invention to provide an automatic frequency control system utilizing semiconductor devices for synchronizing the horizontal deflection system of a television receiver.

It is a different object of the present invention to provide automatic frequency control of a deflection wave generator in which retrace pulse energy from the generator output is utilized to provide effective power amplification of the frequency control signal.

It is a general object of the present invention to provide an improved and simplified automatic frequency control circuit for synchronizing a scanning wave generator with the synchronizing components of a received television signal.

It is another general object of the present invention to provide such an improved automatic frequency control circuit requiring a minimum of component parts and circuitry, and exhibiting a high degree of noise immunity.

A feature of the invention is the provision of an automatic frequency control circuit or phase detector circuit which utilizes a single transistor device and a single diode connected in a novel circuit arrangement having a low output impedance for direct and efficient control of a transistorized scanning wave generator having an input impedance of the order of 3000 ohms or less.

The foregoing and other objects and features of the present invention will be apparent from the following description, taken with the accompanying drawing, throughout which drawing like reference characters indicate like parts, which drawing forms a part of this application, and in which:

FIGURE 1 is a schematic diagram of a television receiver, partially in block diagram form, incorporating the automatic frequency control system of the present invention;

FIG. 2 is a plurality of curves used in explaining the operation of the invention;

Figure 3:
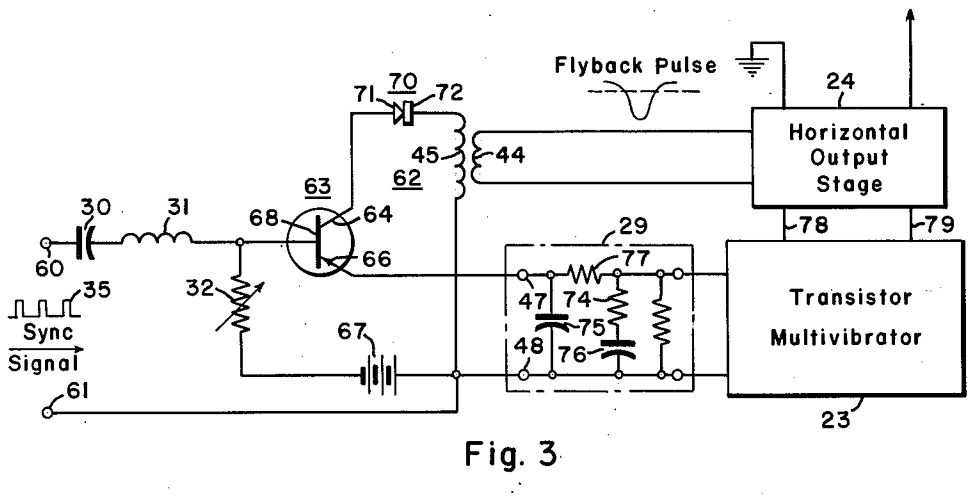
FIG. 3 is a circuit diagram illustrating a modified form of a portion of the system of FIG. 1.

Now referring more particularly to the drawing, in FIG. 1 there is illustrated a television receiver incorporating the automatic frequency control system in accordance with the invention, with the conventional components of the receiver shown in block diagram form. The receiver includes a radio frequency amplifier 10 of any desired number of stages having input terminals connected to a conventional antenna 11, 12; and having output terminals connected to a first detector or converter stage 13. Converter 13 is coupled to an intermediate frequency amplifier stage 14 which, in turn, is coupled to a second detector or video demodulator stage 15. The output circuit of detector 15 is coupled through a video amplifier 16 which may be of conventional form, to the grid and cathode input electrodes of a conventional cathode ray image reproducing device 17.

The output circuit of detector 15 is also connected to the input circuit of a synchronizing signal separator 18, which has first and second output circuits with the first output circuit being coupled through a field sweep system 20 to the field deflection coils 21 of the cathode ray tube deflection yoke. The second output circuit of synchronizing signal separator 18 is coupled through a coupling capacitor 30 to a control circuit 22 constructed in accordance with the present invention. The output of control circuit 22 is coupled through a low pass filter network 29 to a transistorized scanning wave generator 23. Scanning wave generator 23 is connected to the input circuit of a horizontal deflection output stage 24 which, in turn, is coupled to the horizontal deflection coils 25 of the cathode ray tube deflection yoke. The circuitry for processing and reproducing the sound signal which accompanies the received television signal forms no part of the present invention, and accordingly such circuitry is not shown.

The television receiver of FIG. 1 may be tuned to a television signal intercepted by antenna 11, 12, and such television signal is amplified in amplifier 10 and heterodyned to the desired intermediate frequency in the superheterodyne converter 13. The intermediate frequency video carrier signal is amplified in IF amplifier 14 and is demodulated by detector 15 to produce a composite video signal comprising video image components and line and field synchronizing components. The composite video signal is amplified by video amplifier 16 and is applied to the input electrodes of image reproducing device 17 to control the intensity of the cathode ray in accordance with the video signal image intelligence.

The line and field synchronizing components of the video signal are separated from each other and from the picture intelligence by synchronizing signal separator 18. The vertical deflection or field synchronizing components are supplied to field sweep system 20 to synchronize the same, and thereby control the vertical deflection of the cathode ray beam.

The line frequency synchronizing components, from sync separator 18, normally comprise a train of short duration fixed amplitude pulses as shown at 35, which recur, in accordance with accepted standards, at a 15,750 cycle per second rate. The line sync pulses are utilized by phase detector 22 in a manner to be described, to control the frequency and phase of transistor oscillator

23 and, thereby, to control the frequency and phase of the horizontal deflection wave produced by horizontal output stage 24. The deflection current wave produced by stage 24 is applied to the horizontal deflection coils 25 to deflect the cathode ray beam of tube 17 in a manner to intelligibly reproduce the received television signal on the viewing screen.

The phase detector circuit 22, as shown in FIG. 1, includes an integrating network comprising inductor 31 and resistor 32 connected in series across the output terminals of sync separator 18. The junction point of inductor 31 and resistor 32 is connected to the base electrode 38 of n-p-n transistor 33. The sync signal pulse train 35 is applied through coupling capacitor 30 and is integrated by the inductor 31 and resistor 32 to provide a sawtooth voltage wave appearing across resistor 32 and having positive peaks which are time coincident with the sync pulses 35. The sawtooth wave produced by integrating network 31, 32 is applied across the base-emitter circuit of transistor 33 and produces a sawtooth waveform control current in the base-to-emitter current path of the transistor. A source of biasing potential, shown as battery 37, is connected serially with resistor 32 between the base 38 and the emitter 36 to maintain the base to emitter junction of the transistor normally conductive. The sawtooth waveform voltage produced across resistor 32 is additively combined with the potential of source 37. Thus, the emitter-base control current has positive peaks which are time coincident with the synchronizing pulses 35.

It will be understood that the particular integrating network comprising inductor 31 and resistor 32, although advantageous is not essential to this invention. Various other known networks or circuits for integrating the synchronizing pulses 35 to produce a sawtooth base current as shown in FIG. 2(*b*) may be utilized within the scope of the invention.

The horizontal output stage 24 is provided with an auxiliary output circuit 43, constituting a source of positive going retrace pulses, which retrace pulses are substantially time coincident with the flyback or retrace portion of the deflection current wave applied to deflection coils 25. The retrace pulses from source 43 are applied to the primary winding 44 of a pulse transformer having a secondary winding 45. An asymmetrically conductive semiconductor diode 40, having a cathode terminal 42 and an anode terminal 41, has its cathode terminal 42 connected directly to the collector electrode 34 of the transistor 33. The anode 41, of diode 40, is connected to the upper end of secondary winding 45 and the lower end terminal of secondary winding 45 is connected to the upper terminal of a bypass capacitor 46 which has its lower terminal connected to a point of reference potential or ground, and through ground to the emitter electrode 36 of transistor 33.

During each horizontal retrace interval a retrace pulse 110, as best shown in curve C of FIG. 2, is developed in the secondary winding 45 and drives the anode 41 of diode 40 positive thereby rendering the diode temporarily conductive during the retrace pulse interval. With diode 40 being conductive the pulse from winding 45 is applied to the collector electrode 34 and causes a pulse of current to flow through the collector-emitter circuit of transistor 33 and through the series circuit comprising capacitor 46, winding 45 and diode 40. The recurrent pulses of current in the collector circuit of transistor 33 are integrated by capacitor 46 and develop a charge which corresponds to the average or direct current magnitude of the collector current. In accordance with the known function of transistor amplifier devices, the impedance of the collector-emitter current path of transistor 33 is controlled by and is proportional to the magnitude of the base-to-emitter control current. Because of the normally high impedance of the junction transistor 33 the collector current which flows during the duration of the applied retrace pulse is primarily dependent upon the instantaneous base-to-emitter current which exists at the time of the retrace pulse. Accordingly, the amount of current flowing in the collector circuit during each retrace pulse and the amount of charge acquired by capacitor 46 during each retrace pulse is dependent upon the phase relationship between the retrace pulse applied to collector 34 and the sawtooth input voltage at base 38.

In FIG. 2 is shown the operation of the system of FIG. 1 under a plurality of different phase relationships between the synchronizing pulses and the retrace pulses. In curve A of FIG. 2 pulses 91, 92 and 93 indicate normal synchronizing signal as applied to capacitor 30 from synchronizing signal separator 18. At 90 is indicated the condition in which the synchronizing signal is lost as may sometimes occur because of noise interference in the transmission or because of occasional irregularity at the transmitting station. FIG. 2(*b*) indicates the sawtooth current wave flowing in the base-to-emitter circuit of transistor 33 resulting from integration of the synchronizing pulses by inductor 31 and resistor 32. In FIG. 2(*c*) numerals 110 and 111 indicate correctly phased retrace pulses as applied to the phase detector circuit 22 by transformer winding 45. At 112 there is indicated a retrace pulse which lags the synchronizing pulse 92 and corresponds to the condition existing when the frequency of the deflection waveform generator 23 is lower than the frequency of the incoming synchronizing signal. Numeral 113 indicates the retrace pulse output of stage 24 which would be provided if the deflection generator were tending to run at a frequency slightly higher than the frequency of the incoming synchronizing signal 35. Curve 112 indicates the opposite extreme wherein the phase of the deflection wave generator is retarded relative to the incoming synchronizing signal.

The condition indicated by curves 92 and 112 is an undesirable condition which would result in a black bar being displayed at the right-hand edge of the viewing screen. Likewise, the "advanced sweep" condition indicated by curves 93 and 103 is an undesirable condition which would result in a black bar appearing at the left-hand vertical edge of the viewing screen and would result in a portion of the right edge of the display picture being destroyed. The pulses 120—123, as shown in curve D of FIG. 2, indicate the collector current pulses flowing through transistor 33 in response to the various retrace pulse phasings as indicated by pulses 110—113. Pulse 120 indicates the collector current which flows in the absence of a synchronizing pulse at capacitor 30. Pulse 121 indicates the collector current which will flow when the deflection generator is correctly phased as shown by the time coincidence of synchronizing pulse 91 and retrace pulse 111. With such correct phasing retrace pulse 111 coincides with the mid-portion of the positive slope of sawtooth wave 101. It will be appreciated that if the retrace pulse 111 were shifted slightly to the right so as to be closer to the peak of the sawtooth 101, the area of the resultant collector current pulse 121 would be increased. Conversely, if the retrace pulse were slightly retarded in phase relative to the sawtooth wave 101, it would coincide with a portion of the sawtooth base current wave of lower magnitude and accordingly would induce a lesser current flow through the collector-to-emitter circuit and the area of collector current pulse 121 would be decreased. Thus, the charge stored in capacitor 46 during each retrace pulse increases as the phase of the retrace pulses are advanced and decreases as the retrace pulses are retarded relative to the sawtooth waveform base current. By prudent choice of circuit component parameters for the phase detector circuit 22 and by adjustment of the quiescent base current applied to transistor 33 from source 37, the in-phase collector current pulses 121 may be caused to have substantially the same area as the pulse 120 which occurs in the absence of synchronizing signal. By so adjusting the phase detector circuit the output voltage developed by low pass filter network 29 will be substantially the same in the total absence of synchronizing signal as it is in the presence of correct synchronization. The shape of retrace pulses 110—113 (FIG. 2*c*) is not critical and typically may be like half of a sine wave, sometimes with a flat top.

Low pass filter network 29 may be of conventional construction, and by way of example, is shown as comprising input terminals 47 and 48 connected, respectively, to the upper and lower ends of capacitor 46, output terminals 49 and 50 connected, respectively, to first and second input terminals of multivibrator 23 and an integrating filter network comprising resistor 52 connected between input terminal 47 and output terminal 49, capacitor 51 shunted across output terminals 49 and 50 and resistor 58 and capacitor 53 connected in series with the series combination connected in parallel across the output capacitor 51. It is to be understood that the foregoing particular structure for low pass filter 29 is given by way of example only, and that various other known low pass filter networks for integrating recurrent pulses of current and providing a direct current output potential may be utilized. The essential criteria for the low pass filter is that it provides substantial attenuation of alternating current pulses and signals having frequencies of the order of the standard line frequency synchronizing signal (15,750 cycles per second).

As shown by curve D in FIG. 2, the phase detector 22 should be adjusted so that the pulses 123 and 122, respectively, have areas substantially greater than and substantially smaller than the normal pulse 121. With the phase detector circuit 22 so adjusted the D.C. output voltage provided at output terminals 49 and 50 of the filter 29 will be substantially smaller than normal when the frequency of the oscillator 23 is retarded and will be substantially greater than normal when the frequency of the oscillator is tending to be higher than the desired sweep frequency.

The oscillator 23 is shown by way of example as comprising a cathode coupled transistor multivibrator. The structure and operation of such multivibrator circuits are well known in the art and accordingly are not described in minute detail. It will be understood that any one of various known transistor blocking oscillator or multivibrator circuits might be used within the scope of this invention. For example, one oscillator circuit suitable for use with the present invention is shown and described in detail in "Junction Transistor Electronics" by R. B. Hurley; John Wiley and Sons at page 421 and figure 21.6. An outstanding characteristic of all such known multivibrator and blocking oscillator circuits is that they have input impedances of the order of 3000 ohms or less and therefore require substantial power from the phase detector or other source of phase control signal. Conventional dual-diode phase detector circuits will not provide the output current necessary for driving such low impedance oscillators. The circuits of this invention overcome that difficulty by providing substantial power gain between the sync separator 18 and the transistor oscillator 23.

In the circuit of FIG. 1, the capacitor 30 is a blocking capacitor to prevent direct current from flowing through inductor 31 to the output circuit of the sync separator 18. In any system wherein the sync separator circuit 18 has a high impedance to direct current, the capacitor 30 may, of course, be omitted. It will be observed that the phase detector circuit 22 does not require a source of biasing potential for biasing the collector electrode 34 relative to the emitter electrode 36. In accordance with the present invention, unilaterally conductive diode 40 is provided in the collector circuit to maintain the emitter-collector current path nonconductive during intervals between the retrace pulses. Diode 40 further serves to prevent discharge of capacitor 46 through the current path including bias battery 37 and the base-to-collector junction of the transistor 33. In the absence of diode 40, the average potential existing across capacitor 46 would tend to forwardly bias the base-collector junction and collector-to-base current would flow during the time between retrace pulses, thereby rendering the low pass filter 29 incapable of producing a smooth direct current output signal.

In FIG. 3 there is shown a deflection wave generator and automatic frequency control circuit for performing the same functions as the line frequency deflection system of the apparatus of FIG. 1. The circuit of FIG. 3 is provided with an input synchronizing signal at terminals 60 and 61, which signal may be identical to that supplied from sync separator 18 to capacitor 30 in the apparatus of FIG. 1. Connected between input terminals 60 and 61 is an integrating circuit comprising capacitor 30, inductor 31, resistor 32, and bias potential source 67 all connected in series. The integrating circuit is substantially the same as and performs the same function as the circuit having the same reference numerals in the apparatus of FIG. 1. The junction point of inductor 31 and resistor 32 is connected to the base electrode 68 of a p-n-p transistor 63 having a collector electrode 64 and an emitter electrode 66. The integrating circuit 30, 31 and 32 provides a sawtooth waveform current at the base electrode 68 which waveform has peaks corresponding in time to the synchronizing pulses of the input synchronizing signal. Bias potential source 67 has its negative terminal connected through resistor 32 to the base electrode 68 and has its positive terminal connected through capacitor 75 to the emitter electrode 66. Thus, bias potential source 67 operates in conjunction with adjustable resistor 32 to provide a desired level of quiescent control current through the emitter-to-base current path of transistor 63. Capacitor 75 is shunted by a direct current path comprising the input resistance of multivibrator 23 and resistor 77. The collector electrode 64 is connected to the anode 71 of a unilaterally conductive diode 70 which has its cathode 72 connected to the upper end of a secondary winding 45 of a pulse transformer. The lower end of winding 45 is connected to the positive terminal of bias voltage source 67 and to the common input terminal 61. In addition, the common input terminal is connected to the common terminal 48 of the low pass filter 29 and to one input terminal of the multivibrator 23. The other input terminal 47 of low pass filter 29 is connected directly to the emitter electrode 66 of transistor 63. The output terminals of low pass filter 29 are direct current conductively connected to the input circuit of transistor multivibrator 23 in the same manner as heretofore described with reference to the apparatus of FIG. 1. The output circuit 78—79 of multivibrator 23 is connected to the input circuit of horizontal output stage 24 and the output circuit of stage 24 is connected, as shown in FIG. 1, to the horizontal deflection coil of the cathode ray tube yoke. In addition, horizontal output stage 24 is provided with an auxiliary output circuit which is connected to the primary winding 44 of the retrace pulse transformer.

It is to be understood that in accordance with conventional practice, the pulse transformer 44—45 need not be a special component provided in the phase detector circuit 62 but may simply comprise an auxiliary winding on the conventional flyback transformer of the horizontal output stage 24. The retrace pulse circuit of FIG. 3 differs from the corresponding circuit of FIG. 1 in that winding 45 is connected so as to apply a negative going retrace pulse to the cathode 72 of diode 70 during the retrace portion of the horizontal deflection waveform. The negative going retrace pulse supplied to the cathode of diode 70 renders the same conductive thereby permitting current to flow through the collector-emitter circuit of transistor 63 and through the series circuit comprising capacitor 75, secondary winding 45 and diode 70. The pulse of current produced in the collector circuit of transistor 63 during each retrace interval is proportional in amplitude to the amplitude of the control current flowing in the emitter-base circuit at the time of the retrace pulse. Accordingly, the amplitude of the collector current pulses is determined by the instantaneous amplitude of the sawtooth base current waveform at the time of occurrence of the retrace pulses. Thus, during each retrace pulse interval a charge is delivered to capacitor 75 of a magnitude dependent upon the phase relationship of the retrace pulse with respect to the sawtooth signal developed across resistor 32 and applied to the base of transistor 63. The low pass filter 29 of FIG. 3 may be the same as the corresponding low pass filter of FIG. 1 and accordingly is not described in detail. The output circuit of the low pass filter 29 produces a filtered direct current signal corresponding to the direct current average value of the current flowing in the collector circuit of transistor 63. Direct current automatic frequency control signal from the output of filter 29 is applied to the input circuit of multivibrator 23 and operates to control the frequency thereof.

Figure 4:
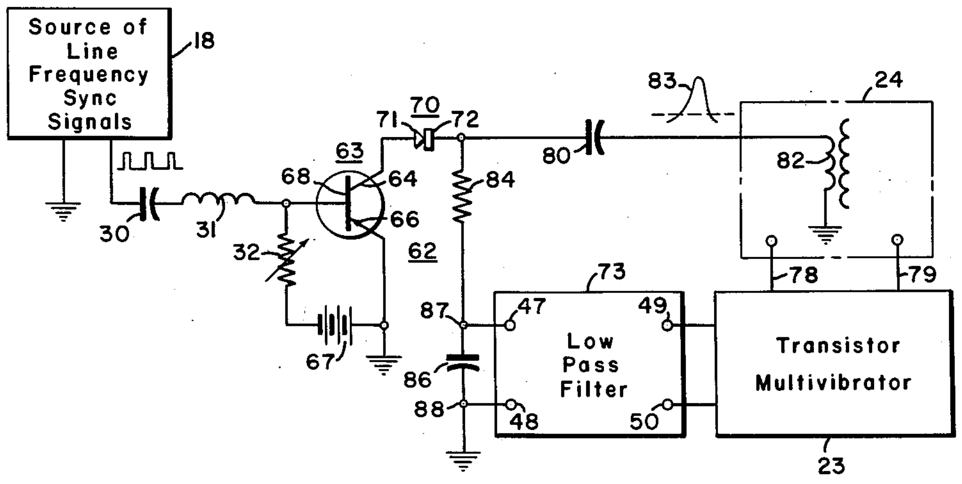
FIG. 4 illustrates a further embodiment of an automatic frequency control system in accordance with the present invention.

In FIG. 4 there is shown a refined embodiment of apparatus in accordance with the present invention which is similar in most respects to the apparatus of FIG. 3 and differs only in that the supply of retrace pulses to the phase detector circuit of FIG. 4 is connected in shunt with the control signal output portion of the phase detector circuit. The apparatus of FIG. 4 comprises a phase detector circuit 62 including a p-n-p transistor 63 and a unilaterally conductive diode 70 which are identical to the corresponding elements of the apparatus of FIG. 3. The sync signal integrating circuits 30, 31 and 32 are identical to the corresponding elements of FIG. 3 and have the same functions. The collector electrode 64 of transistor 63 is directly connected to the anode of diode 70 and the emitter electrode 66 is connected directly to ground or a point of reference potential. The cathode of diode 70 is connected through a series combination comprising isolating resistor 84 and capacitor 86 to ground. The cathode 72 of diode 70 is further connected through a coupling capacitor 80 to an auxiliary winding 82 of the horizontal deflection flyback transformer, with the lower end of auxiliary winding 82 being connected to ground. The upper and lower terminals of capacitor 86 are connected, respectively, to the first and second input terminals 47 and 48 of low pass filter 73. The filter 73 may be identical in structure and function to the corresponding filter 29 of FIG. 1 or FIG. 3. The output terminals 49 and 50 of filter 73 are connected directly to the input circuit of multivibrator 23 which has its output circuit 78 connected to the input circuit 79 of horizontal deflection output stage 24.

The circuit of FIG. 4 operates in substantially the same manner as that of FIG. 3 to provide pulses of collector current which are stored in capacitor 86 and which correspond in amplitude to the relative phase of the retrace pulses 83 with respect to the sawtooth waveform current in the base-to-emitter circuit. The retrace pulses from auxiliary winding 82 are applied through the D.C. blocking coupling capacitor 80 to the cathode of diode 70 to render it conductive during the retrace pulse interval. With diode 70 rendered conductive the retrace pulse is applied therethrough to the collector electrode 64 and induces current flow in the emitter-collector circuit in proportion to the instantaneous amplitude of the base-to-emitter control current. Each pulse of collector current is temporarily stored by capacitor 80 and the charge from capacitor 80 flows through resistor 84 to capacitor 86 during the intervals between retrace pulses. Accordingly, capacitor 86 partially integrates the periodic pulses of collector current and provides input signal to low pass filter 73 corresponding to the magnitude of the collector current impulses. Low pass filter 73 exhibits a high input impedance to alternating current pulse components and exhibits a relatively low impedance to direct current. Accordingly, it produces at its output terminals 49 and 50 a smooth direct current control signal which varies in magnitude as a function of the phase relationship between the horizontal deflection retrace pulses and the line frequency synchronizing signals from the synchronizing signal separator 18. The circuit of FIG. 4 has the advantage that the retrace pulses are applied to the collector circuit independently of the control signal output circuit. This circuit arrangement may have advantage in any system wherein it is desired to isolate the retrace pulse source 82 from the direct current circuit of the collector-emitter current path.

From the foregoing disclosed embodiments, it will be apparent to persons skilled in the art that the present invention provides a phase detector circuit for automatic frequency control which utilizes the enegy supplying capabilities of the horizontal deflection retrace pulse to provide power amplification of the direct current control signal produced by the phase detector. Further the circuit provided by the present invention enables a substantial economy of circuit components and circuit complexity as compared to conventional dual-diode phase detector circuits. In addition, the various circuits of the present invention provide substantially improved noise immunity as compared to conventional dual-diode phase detectors. Such noise immunity enhancement is provided by the inductive integrating circuit 30, 31 and 32 at the input of the transistor phase detector. The input integrating network has a low pass frequency characteristic which prevents sporadic noise pulses at the output of the sync separator from having any substantial effect on the control current applied to the base-emitter circuit of the transistor. Further, since the transistor phase detector circuit is arranged to be conductive only during the time interval of the retrace pulses, it is inherently immune to noise pulses or irregular synchronizing pulses occurring during the time interval between retrace pulses.

While the present invention has been shown in certain preferred embodiments only, it will be obvious to those skilled in the art that it is not limited to the particular embodiments dsclosed, but is susceptible of various changes and modifications without departing from the spirit and scope thereof.

I claim as my invention:

1. A system for synchronizing a periodic wave generator with a synchronizing pulse wave comprising a transistor having an emitter, a collector and a control electrode; means for integrating said synchronizing pulse wave to provide a sawtooth voltage wave and applying the same to said control electrode; pulse source means for providing, from the generator output, time spaced voltage pulses of predetermined magnitude, means for applying said voltage pulses to the collector of said transistor to induce current flow in the emitter-collector current path thereof during the duration of each of said pulses; low pass filter means, having an output circuit connected to said periodic wave generator and having a pair of input terminals, for producing a unidirectional control current corresponding to the average direct current value of current pulses applied to said input terminals; a unilaterally conductive diode device; means providing a direct current conductive series circuit including said diode, said input terminals and the emitter-collector current path of said transistor for applying current pulses from said collector to said filter means, said diode being so poled that collector current flow through said transistor during the time intervals between said voltage pulses is prohibited, whereby said filter means applies a control current to said generator which varies in accordance with the phase of the output of the generator relative to the phase of said synchronizing pulse wave.

2. In a television receiver the combination comprising a source of positive going sync pulses, a deflection generator including a control potential responsive variable phase oscillator and a source of retrace pulses, an integrating network coupled to said source of sync pulses for producing a sawtooth current wave having peaks corresponding in phase to said sync pulses, phase comparison means including a transistor having a collector electrode, an emitter and a control electrode, circuit means for applying said sawtooth current wave across the emitter-control electrode current path of said transistor, means coupling said source of retrace pulses to the collector electrode of said transistor, a load circuit connected in series with the emitter-collector current conduction path of said transistor with said load circuit including an integration network having output terminals coupled to supply a direct current control potential to said oscillator for varying the phase thereof in accordance with the phase of said retrace pulses relative to said synchronizing pulses, and a unilaterally conductive device connected serially with said load circuit in said emitter-collector current path to prohibit reverse current through said current path during intervals between occurrence of said retrace pulses.

3. In a television receiver horizontal deflection system a source of line frequency sync pulses; an indirectly synchronized line frequency deflection wave generator of the type which is phase controlled by a unidirectional automatic phase control potential, with said generator comprising a source of retrace pulses which occur simultaneously with the retrace portion of the deflection wave; low pass filter means, having an output circuit coupled to said deflection wave generator and having a pair of input terminals, for producing a unidirectional phase control potential corresponding to the time integral of current pulses applied to said input terminals; a unidirectionally conductive semiconductor diode; a phase comparator transistor means having emitter, collector and control electrodes and having an emitter-collector current path connected in series circuit with said retrace pulse source, the input terminals of said filter means, and said diode; an integrating circuit means coupled to said source of sync pulses for producing a sawtooth wave having time spaced peaks corresponding to the time spacing of said sync pulses; and means coupled to said circuit means for applying said sawtooth wave to said control electrode so that current flows through said series circuit only during said retrace pulses and in proportion to the instantaneous amplitude of said sawtooth wave at the times of occurrence of said retrace pulses, with said semiconductor diode being poled to permit forward current flow in response to said retrace pulse and to prohibit reverse current flow from said filter means during periods between said retrace pulses, whereby said low pass filter means integrates the forward current pulses in said series circuit to provide a control potential which varies as a function of the phase relation of said retrace pulses and sync pulses.

4. In a television receiver deflection system: a source of line frequency sync signals; an indirectly synchronized multivibrator comprising a pair of regeneratively coupled transistors for generating a line frequency deflection wave, said multivibrator being of the type which is frequency controlled by a direct current automatic frequency control signal, a deflection output stage coupled to said multivibrator including a pair of output terminals for providing retrace pulses which occur simultaneously with the retrace portion of the deflection wave; phase comparator means including a transistor having an emitter electrode, a collector electrode and a control electrode; means for integrating said line frequency sync signals to provide a sawtooth voltage waveform reference signal and for applying the same to said control electrode so that a sawtooth waveform control current flows through the emitter-control electrode circuit of said transistor; filter means, having an output circuit coupled to the control signal input circuit of said multivibrator and having a pair of input terminals, for producing a direct current frequency control signal corresponding to the average current applied to said input terminals; a unidirectionally conductive diode; and a direct current series circuit including said diode, said output terminals, said input terminals of said filter means, and the emitter-collector current path of said transistor with said diode being connected with such polarity that said retrace pulses are in a sense tending to render said diode conductive and tending to produce current flow through the emitter-collector current path of said transistor substantially in proportion to the amplitude of said sawtooth waveform control current at the times of occurrence of said retrace pulses, thereby to develop in said filter means a control signal having an amplitude determined by the phase of said retrace pulses relative to said line frequency sync signals.

5. In a television receiver horizontal deflection system: a source of line frequency sync signals; an indirectly synchronized multivibrator comprising a pair of regeneratively coupled transistors for generating a line frequency deflection wave, said multivibrator being of the type which is frequency controlled by a direct current automatic frequency control signal and including a control signal input circuit having an input impedance of the order of 500 ohms; a horizontal deflection output stage coupled to said multivibrator including a flyback transformer having a pair of output terminals for providing retrace pulses which occur simultaneously with the retrace portion of the horizontal deflection wave; phase comparator means including a transistor having an emitter electrode, a collector electrode and a control electrode; means for integrating said line frequency sync signals to provide a sawtooth voltage waveform phase reference signal and for applying the same to said control electrode so that a sawtooth waveform control current flows through the emitter-control electrode circuit of said transistor; low pass filter means, having an output circuit coupled to the control signal input circuit of said multivibrator and having a pair of input terminals, for producing a direct current frequency control signal corresponding to the average current applied to said input terminals; a unidirectionally conductive diode; and a direct current series circuit including said diode, said output terminals of the flyback transformer, said input terminals of said low pass filter means, and the emitter-collector current path of said transistor with said diode being connected with such polarity that said retrace pulses are in a sense tending to render said diode conductive and tending to produce current flow through the emitter-collector current path of said transistor substantially in proportion to the amplitude of said sawtooth waveform control current at the times of occurrence of said retrace pulses, thereby to develop in said low pass filter means a control signal having an amplitude determined by the phase of said retrace pulses relative to said line frequency sync signals; a source of biasing voltage connected between said series circuit and said control electrode for biasing the emitter-control electrode junction of said transistor in a forwardly conductive sense with said diode being connected in said series circuit in a polarity to prohibit current flow from said source of biasing voltage through the collector-control electrode junction of said transistor.

6. In a television receiver deflection system: a source of line frequency sync signals; an indirectly synchronized multivibrator comprising a pair of regeneratively coupled transistors for generating a line frequency deflection wave, said multivibrator being of the type which is frequency controlled by a direct current automatic frequency control signal, a deflection output stage coupled to said multivibrator including a pair of output terminals for providing retrace pulses which occur simultaneously with the retrace portion of the deflection wave; phase comparator means including a transistor having an emitter electrode, a collector electrode and a control electrode; phase comparison means including a transistor having base, emitter and collector electrodes; means for integrating said sync signals to provide a sawtooth waveform reference signal and for applying the same across the emitter-base current path of said transistor to produce a sawtooth waveform control current in said current path; a unidirectionally conductive diode having one terminal connected to said collector electrode; a blocking capacitor connected in series combination with the output terminals of said deflection output stage, with the series combination being connected at one end to said emitter electrode and at the other end to the other terminal of said diode; a load circuit for said transistor comprising a resistance and a capacitance connected in series with said load circuit being connected between said diode and said emitter electrode in parallel with said series combination; low pass filter means, having an input circuit connected across the capacitance of said load circuit and having an output circuit connected to the control signal input circuit of said multivibrator, for producing a direct current frequency control signal corresponding to the average collector current of said transistor; said unidirectionally conductive diode being poled oppositely with respect to the base-collector junction of said transistor and so that said diode prohibits current flow through said base-collector junction during the time intervals between said retrace pulses; said retrace pulses having a polarity tending to render said diode conductive and tending to produce current flow through the emitter-collector current path of said transistor substantially in proportion to the amplitude of said sawtooth waveform control current during said retrace pulses, thereby to develop in said low pass filter means a control signal having an amplitude dependent upon the phase relation between said retrace pulses and said line frequency sync signals.

References Cited in the file of this patent

UNITED STATES PATENTS 2,868,975 Harris et al. ____________ Jan. 13, 1959